Figure 4A:
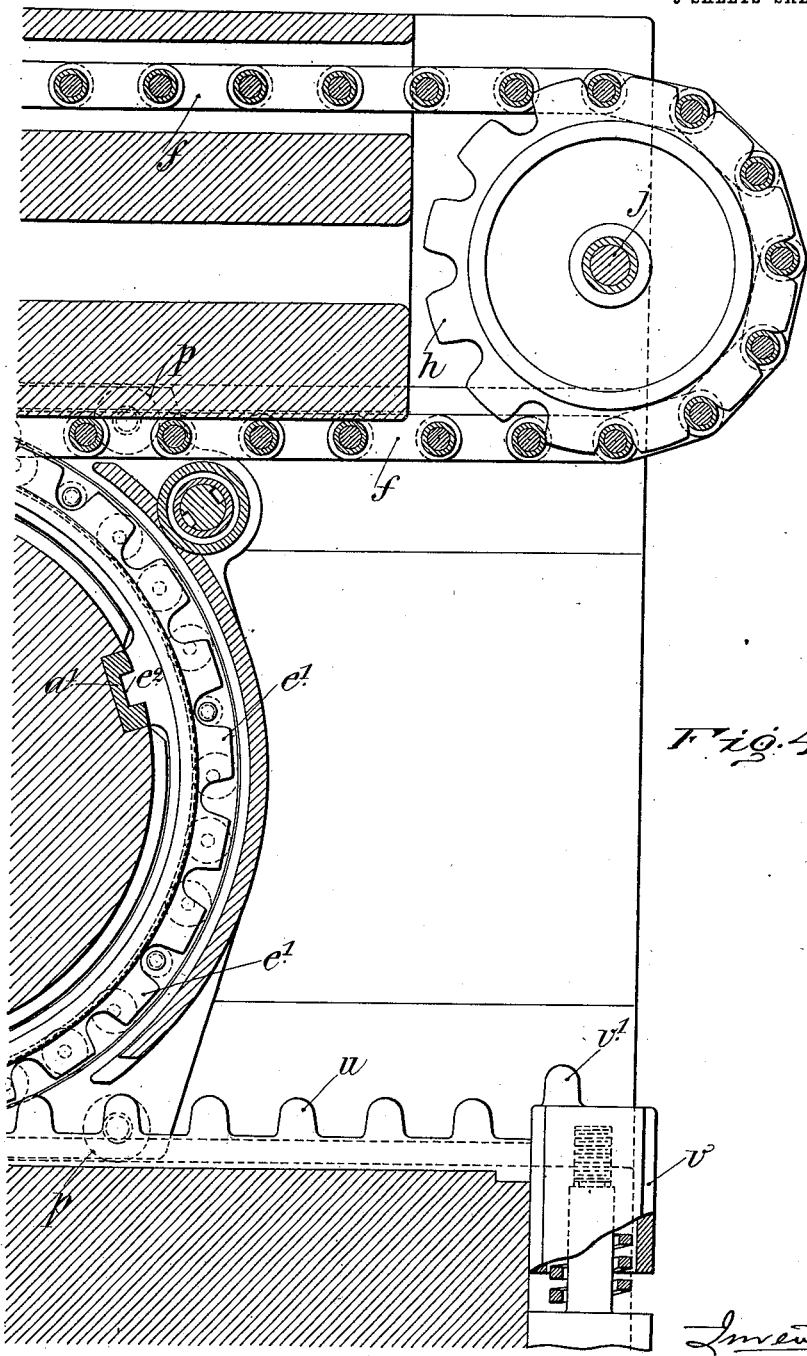

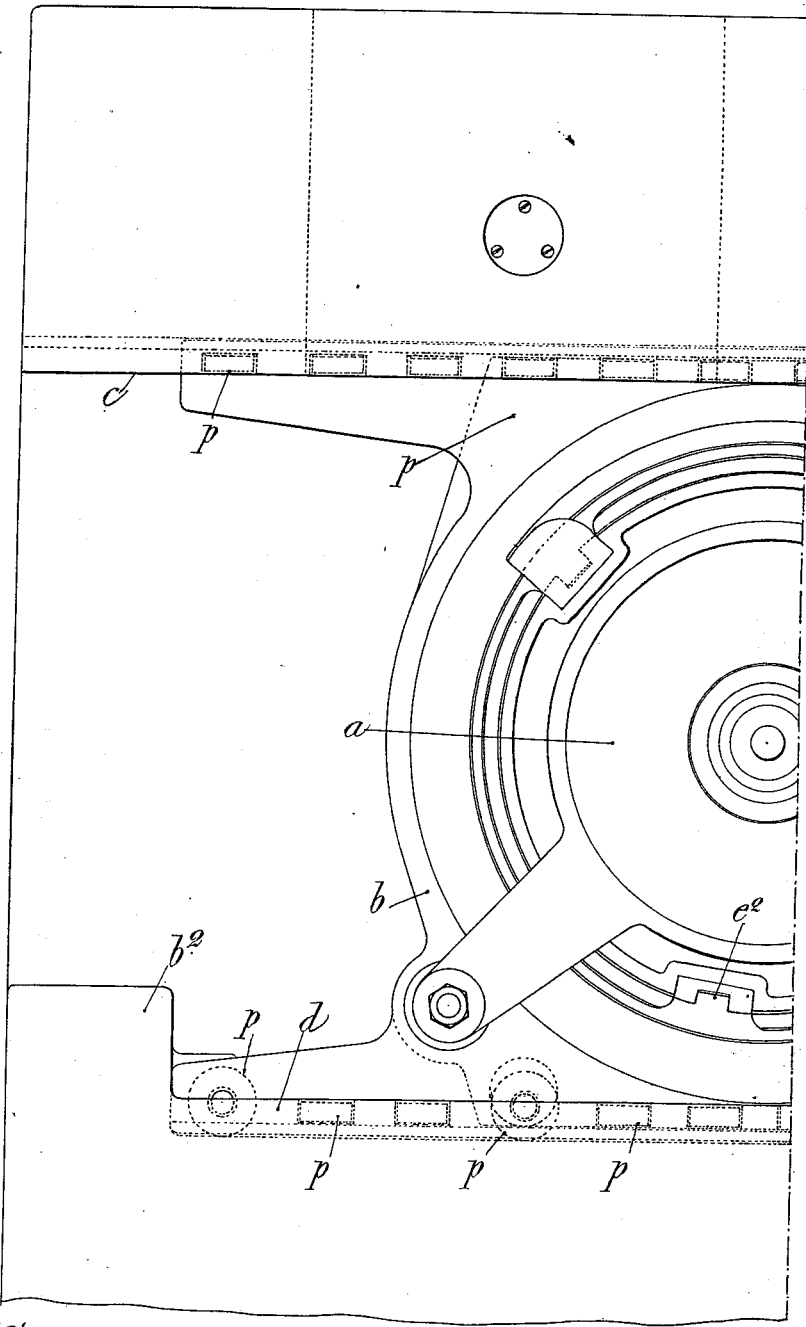

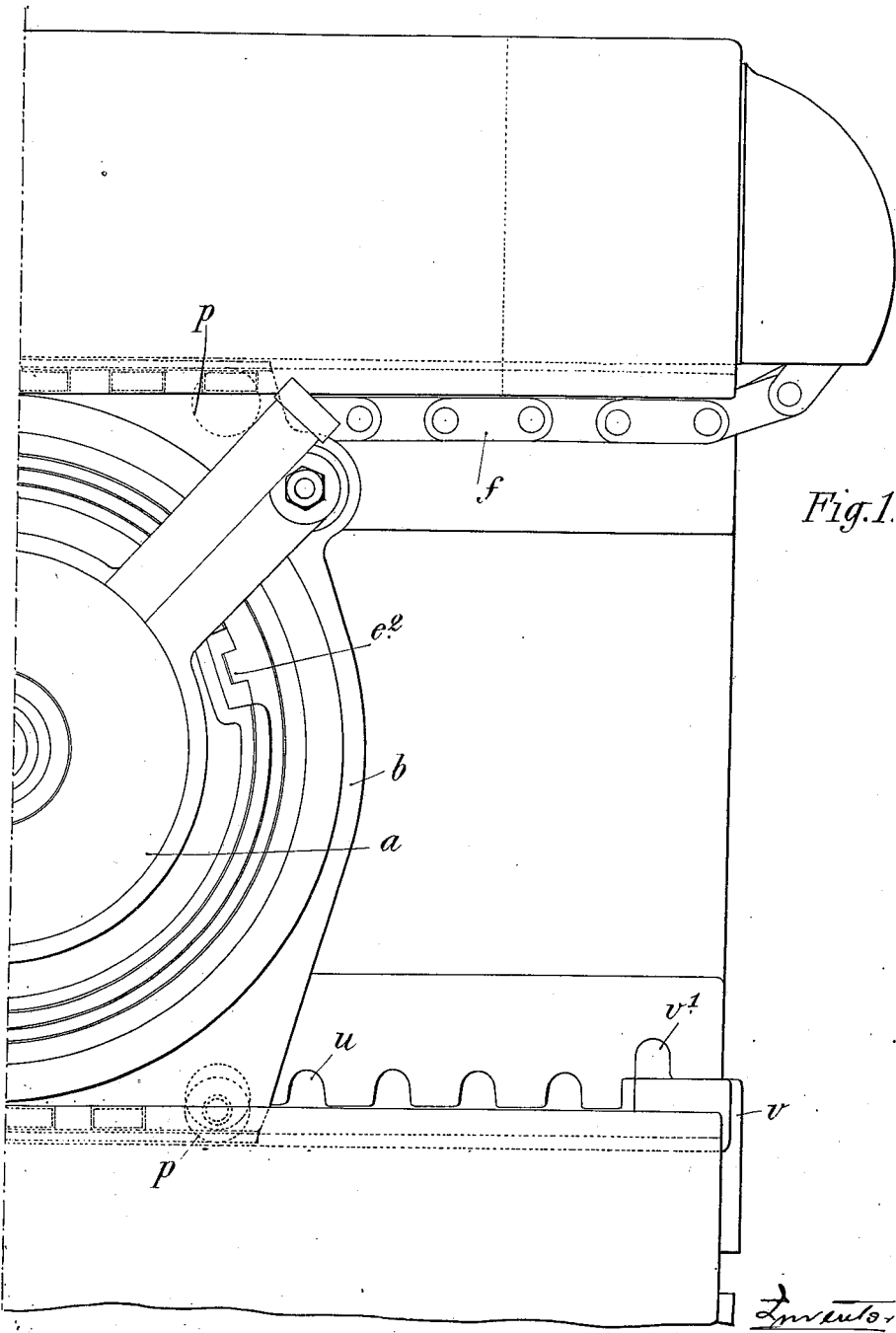

E. SCHNEIDER.
BREECH MECHANISM OF GUNS.
APPLICATION FILED NOV. 29, 1911.
1,094,753.
Patented Apr. 28, 1914.
9 SHEETS—SHEET 3.
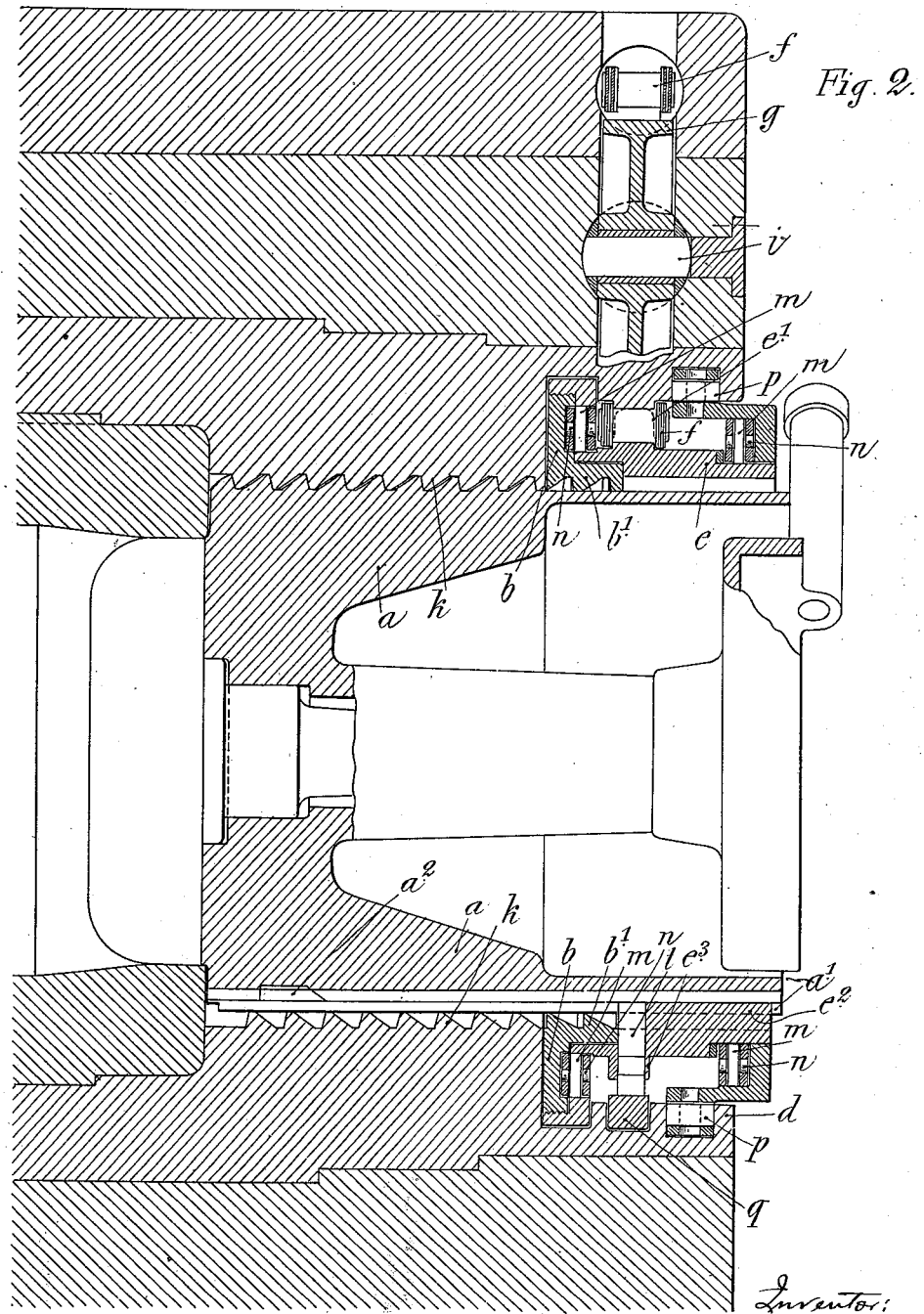

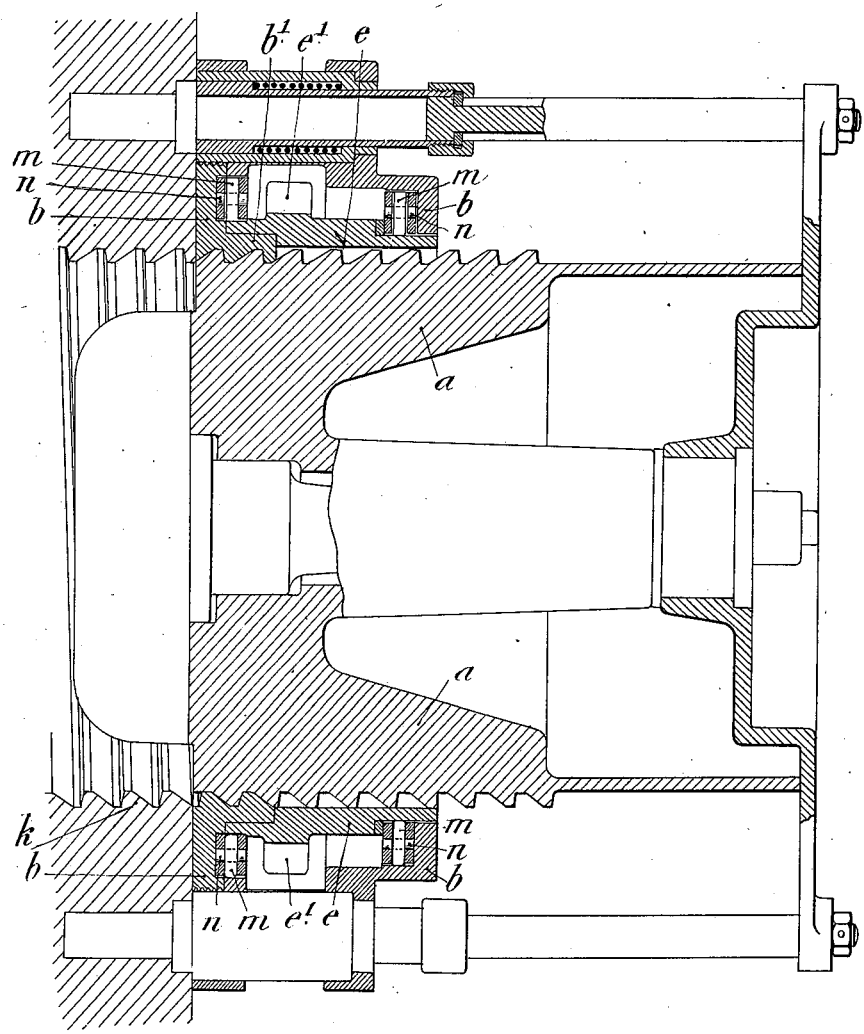

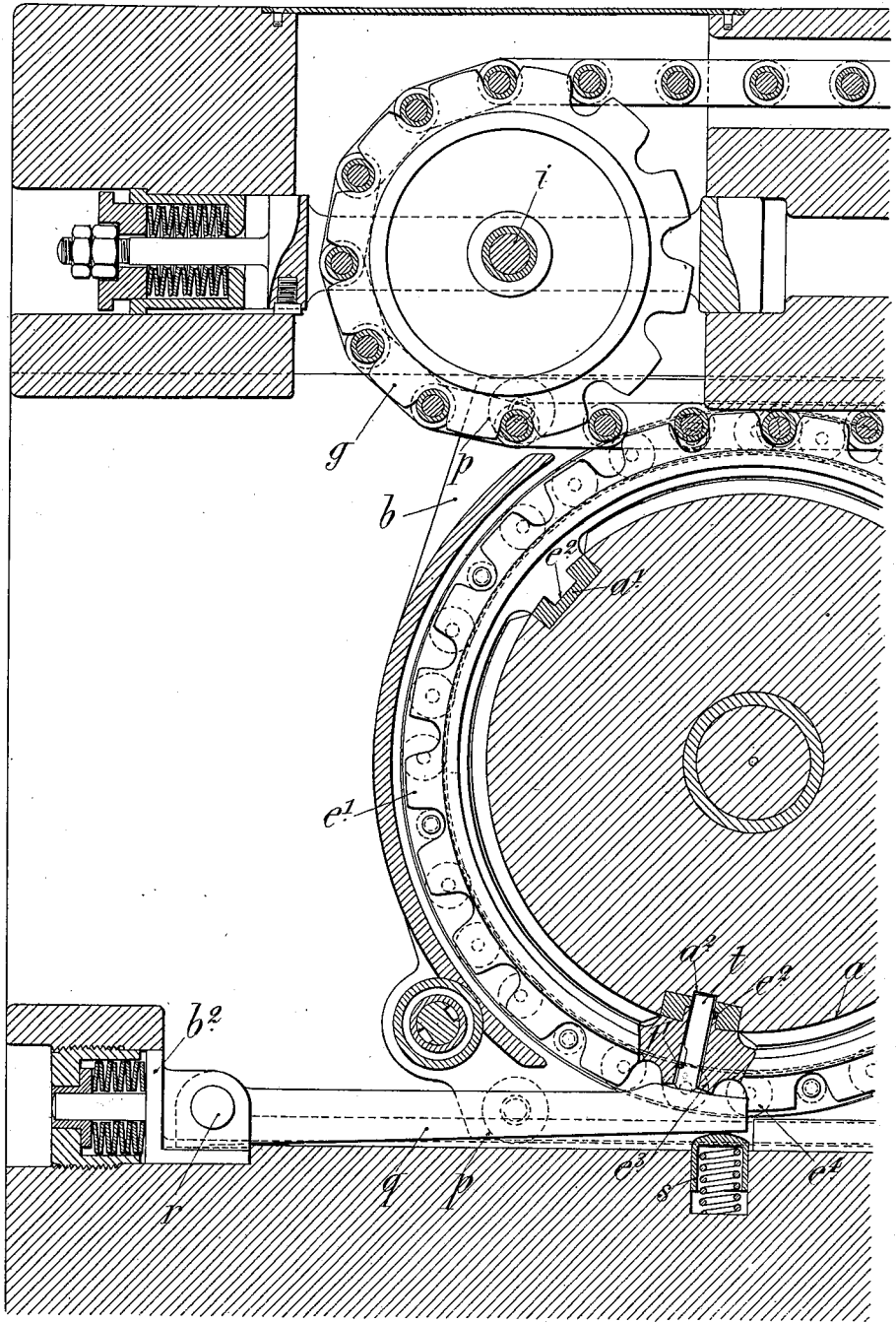

E. SCHNEIDER.
BREECH MECHANISM OF GUNS.
APPLICATION FILED NOV. 29, 1911.

1,094,753.

Patented Apr. 28, 1914.
9 SHEETS—SHEET 6.

E. SCHNEIDER.
BREECH MECHANISM OF GUNS.
APPLICATION FILED NOV. 29, 1911.
1,094,753.
Patented Apr. 28, 1914.
9 SHEETS—SHEET 7.
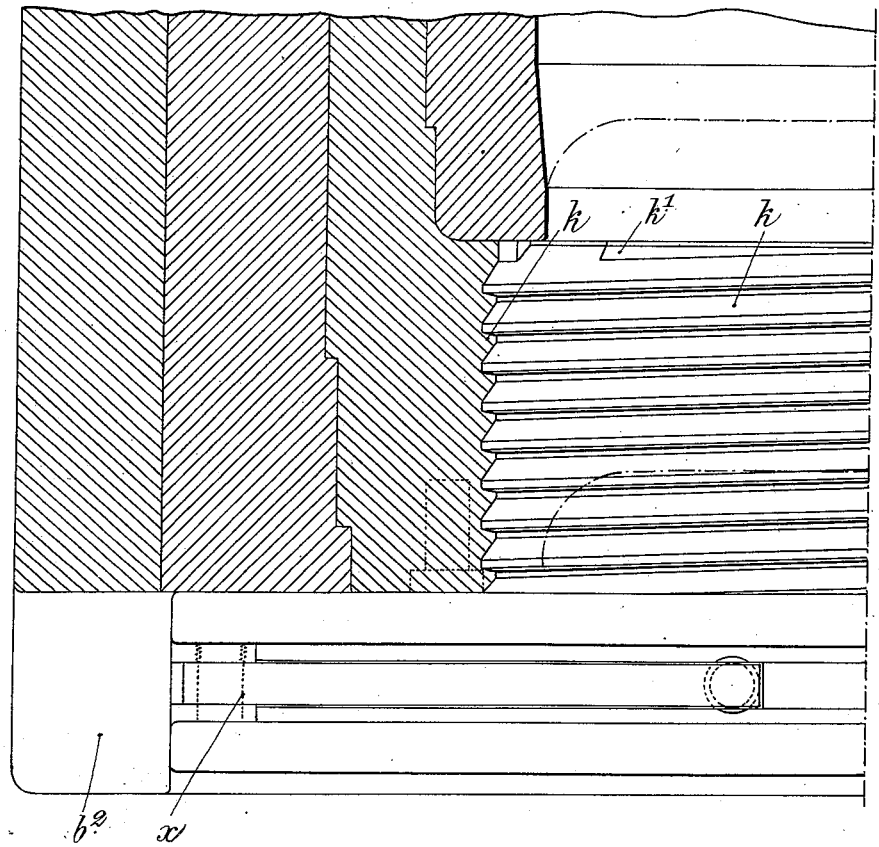

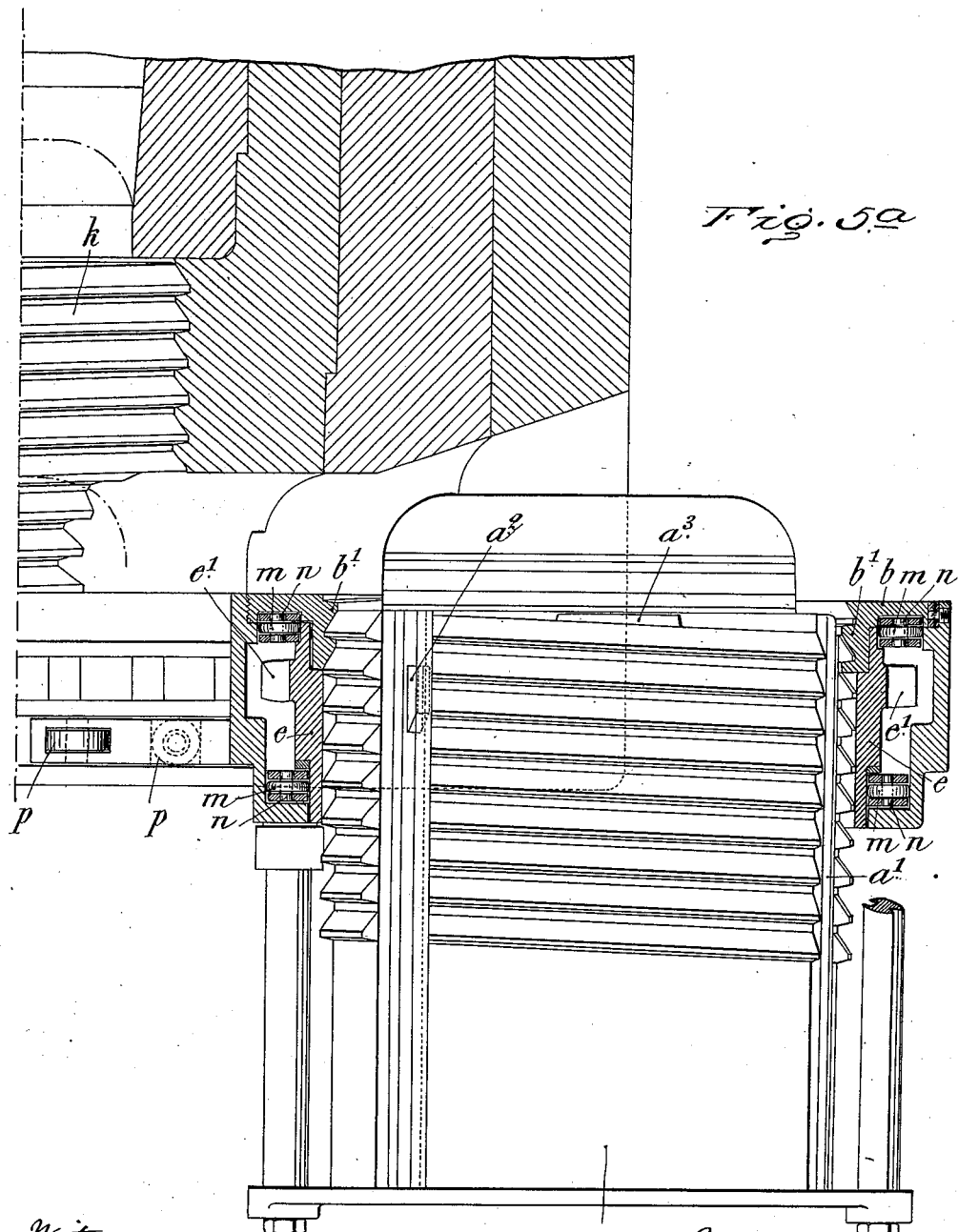

E. SCHNEIDER.
BREECH MECHANISM OF GUNS.
APPLICATION FILED NOV. 29, 1911.
1,094,753.
Patented Apr. 28, 1914.
9 SHEETS—SHEET 9.
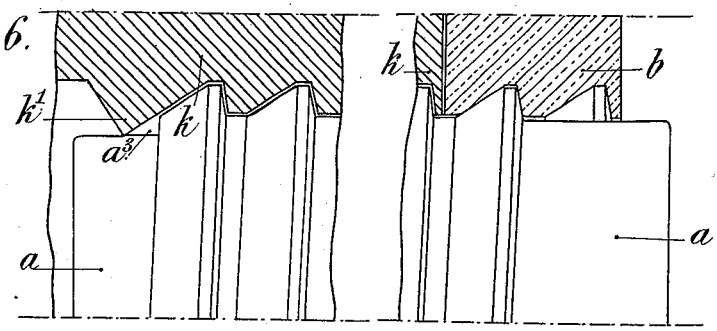
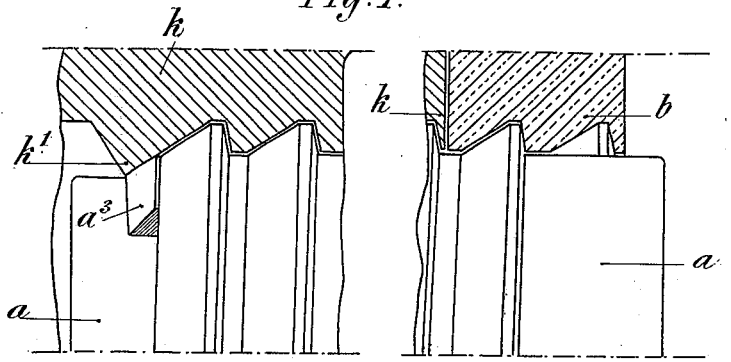
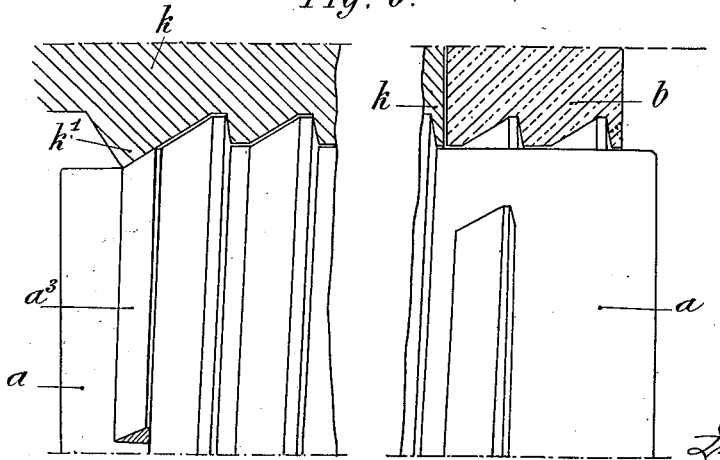

UNITED STATES PATENT OFFICE.

EUGÈNE SCHNEIDER, OF LE CREUZOT, FRANCE.

BREECH MECHANISM OF GUNS.

1,094,753.   Specification of Letters Patent.   Patented Apr. 28, 1914.

Application filed November 29, 1911. Serial No. 663,035.

*To all whom it may concern:*

Be it known that I, EUGÈNE SCHNEIDER, a citizen of the Republic of France, residing at Le Creuzot, Saône-et-Loire, France, have invented new and useful Improvements in or Relating to Breech Mechanism of Guns, which is fully set forth in the following specification.

This invention relates to breech mechanism for guns and has for its object a breech screw having continuous threads, the opening of the breech being effected by the breech screw moving aside or laterally after its unscrewing and withdrawal from the breech have been effected.

According to the present invention the breech screw support and its operating mechanism are such that they permit of producing complete opening and closing by a continuous rotation of the breech screw or block around its longitudinal axis. The essential advantage of this device is that the *vis viva* stored up in the breech screw during its unscrewing instead of being absorbed as a total loss contributes to the continuation of the movement and to the smooth transition from the movement of unscrewing to the movement of lateral displacement and vice versa.

A practical embodiment of the invention is illustrated by way of example in the accompanying drawing in which:—

Figures 1 and 1$^a$ are a rear elevation and Fig. 2 a longitudinal section showing the breech closed. Fig. 3 is a longitudinal section showing the breech screw unscrewed and before its displacement to the side of the gun. Figs. 4 and 4$^a$ are a cross section of the operating or transmission gear, the breech screw occupying a similar position to that shown in Fig. 3, and Figs. 5 and 5$^a$ are a horizontal section showing the breech screw open and laterally displaced. Figs. 6, 7 and 8 are partial sectional elevations showing the positions assumed by the threads of the breech screw in the breech nut and in the shutter or carriage in which the breech is mounted during the unscrewing operation, at the beginning of the closure, and when the breech is completely closed respectively.

The breech screw comprises a cylindrical block $a$ the thread of which is substantially continuous. In the breech-open position this breech block or screw is carried by a shutter or carriage $b$, the inner part of which forms a nut, that can slide by means of its outer longitudinal edges in transverse or lateral guides $c\ d$ formed in the gun. The latter is suitably recessed at the rear so as to enable the shutter or carriage $b$ to move to one side. The reëntering or closing lateral movement of the shutter-nut $b$ is limited by a suitable stop $b^2$ in which position the shutter-nut then comes in line with the breech nut.

In order to insure continuous rotation of the breech screw in the operations of opening and closing, the shutter $b$ forms a trunnion or pivot at $b'$ for an operating member such as a sleeve $e$ provided with external teeth $e'$ and internal ribs $e^2$ engaging in corresponding longitudinal grooves $a'$ (Fig. 2) of the breech screw $a$; the screw is thus able to slide upon the ribs $e^2$ of the operating member $e$ while at the same time rotating in the internal threads of the shutter $b$.

The teeth $e'$ constantly mesh with an endless chain $f$ which passes over two toothed wheels $g\ h$ mounted respectively upon the shafts $i$ and $j$ carried by the gun.

It will readily be seen that a movement of rotation imparted to the external shaft $j$ either by hand or by motor continuously drives the chain $f$ and causes the wheel $e$ to travel by engaging with the lower length of this chain. The wheel $e\ e'$ rotating on the shutter $b$ rotates the breech screw $a$ by means of the ribs $e^2$. When the threads in the shutter come in line with the threads on the breech nut $h$ the breech screw $a$ is ready to enter the latter; the continuation of the movement of the chain $f$ thus completes the closing of the breech, the breech screw continuing to rotate around its longitudinal axis. The opening movement is effected by a rotation of the shaft $j$ in the opposite direction.

In order to facilitate the rotation of the operating member $e\ e'$ on the carriage or shutter $b$ the rollers $m$ may be mounted upon spindles $n$ on the said carriage. The sliding of the carriage is facilitated by rollers $p$ carried by it and running in the guides $c\ d$ of the gun.

In the example of the invention illustrated, the lateral displacement of the carriage or shutter $b$ by the breech screw $a$ when the breech is opened is insured by a stop or tappet lever $q$ (Fig. 4) capable of oscillating around a shaft $r$ carried by the gun and subjected to the action of a spring plunger $s$. Normally, that is to say, during almost the whole of the unscrewing of the breech screw this tappet lever is forced down and held aside by the teeth $e'$ of the wheel $e$. One of the teeth $e^3$ of this wheel is of smaller height and formed with a radial hole in which a tappet $t$ is capable of a longitudinal movement which is limited by a pin $t'$. During the unscrewing the tappet and tappet lever occupy the position indicated in Fig. 2. The pressure on the upper end of the tappet $t$ by the breech screw $a$ causes it to project above the frusto-conical tooth so that it completes the height of this tooth. At the moment at which the unscrewing is completed a recess $a^2$ formed in the screw comes opposite the tappet $t$ thereby enabling the spring plunger $s$ to press said tappet back by the intermediary of the oscillating stop or tappet lever $q$, as shown in Fig. 4. The front face of this stop thus comes in the path of the tooth $e^4$ which follows the frusto-conical tooth $e^3$. The movement of rotation of the toothed member $e$ around the geometrical axis of the gun is thus momentarily arrested but the member $e$ is displaced by the chain $f$ while continuing to rotate, by moving laterally with the carriage or shutter $b$ and traveling on a rack $u$ fixed to the gun. The outward travel of the carriage $b$ is limited by a spring buffer $v$ carrying a tooth or projection $v'$ with which the teeth $e'$ engage.

In the example of the invention illustrated the arrangement of the threads of the breech nut and of the shutter or shutter-nut $b$ is such that there is longitudinal play between the threads $k$ of the breech nut and the threads of the breech screw, and the latter contact with the former only during the initial period of opening and the final period of closing (approximately a twelfth of a revolution) which periods correspond to the unscrewing and the screwing of ordinary screw breeches. Throughout the entire duration of the opening and of the closing apart from the two small periods mentioned above, the breech screw is constantly supported without longitudinal play in the shutter-nut and rotates without friction in the threads of the breech nut. This arrangement of the screw threads eliminates any risk of steel binding against steel during unscrewing because a clearance of at least a mm. always exists between the threads of the breech screw and of the breech nut. The pitch is of course the same as regards the breech nut, the breech screw and the shutter but the threads of the breech screw present longitudinal play amounting to 2 mm. for example relatively to the threads of the breech nut. There also exists in front of the breech screw and in front of the breech nut $k$ a portion of a thread $a^3$ and $k'$ respectively amounting to one and two twelfths of a turn for example of the same pitch but of smaller external diameter than the other threads. These portions of threads $a^3 k'$ (Figs. 6, 7 and 8) are arranged so that they only contact when the screw comes within less than two twelfths of a revolution of its complete closure. Up to this moment the threads of the breech screw $a$ retained without play in those of the shutter-nut $b$ (Fig. 6) have rotated without touching them inside the threads $k$ of the breech nut, but as soon as the portions of threads $a^3 k'$ which act as bearing threads have come into contact, the threads of the breech screw $a$ leave those of the shutter-nut $b$ and the rotation continuing, the threads of the breech screw make contact with the threads of the breech nut and retain this contact during the whole of the final twelfth revolution as in the screwing of ordinary screw breeches, the stop threads being arranged elsewhere so that the breech screw cannot resume its longitudinal play during this screwing period. Owing to this special arrangement the continuous rotation of the breech screw cannot cause any binding of steel on steel because apart from the initial period of a twelfth revolution the threads of the breech screw rotate with suitable play in the threads of the breech nut.

What I claim and desire to secure by Letters Patent of the United States is:—

1. A gun provided with a screw-threaded breech, a screw-threaded breech-screw, a non-rotatable carriage or shutter having screw threads engaging those on said breech-screw, and a rotatable element interposed between said carriage and screw for simultaneously rotating and displacing the latter longitudinally throughout its rearward movement.

2. A gun provided with a screw-threaded breech, a screw-threaded breech-screw, a shutter having screw threads engaging those on said breech-screw, a movable member carried thereby, a rib and groove connection between said screw and movable member, and means imparting movement to said member to simultaneously rotate and longitudinally displace said screw throughout its rearward movement.

3. In a gun provided with a screw-threaded breech, a screw-threaded breech-screw, a track or way arranged transversely of the gun, a non-rotatable shutter having screw threads engaging those on said breech-screw movable on said track or way, a movable element carried by said shutter, and means imparting movement to said element to simultaneously rotate and longitudinally displace said screw throughout its rearward movement.

4. A gun provided with a screw-threaded breech, a screw-threaded breech-screw, a shutter having screw threads engaging those on said breech-screw, a movable member carried thereby, a rib and groove connection between said screw and movable member, and means imparting movement to said member to simultaneously rotate and longitudinally displace said screw throughout its rearward movement, said means also displacing said screw with respect to the longitudinal axis of the gun.

5. A gun provided with a screw-threaded breech, a screw-threaded breech-screw, a shutter having screw threads engaging those on said breech-screw, a movable member carried thereby, a rib and groove connection between said screw and movable member, and common means imparting movement to said member to simultaneously rotate and longitudinally displace said screw throughout its rearward movement and to move said screw and shutter laterally with respect to the longitudinal axis of the gun.

6. In a gun, the combination of a breech, a stationary track or way arranged transversely thereof, a screw-threaded non-rotatable shutter movable laterally thereon, a breech-screw rotating in and having screw threads engaging those on said shutter, a rotatable member carried by said shutter, a rib and groove connection between said member and screw, and means imparting movement to the former to simultaneously rotate and longitudinally displace said screw throughout its rearward movement.

7. In a gun, the combination of a breech, a track or way arranged transversely thereof, a screw-threaded non-rotatable shutter movable thereon, a breech-screw rotating in and having screw threads engaging those on said shutter, a sleeve carried by said shutter, a plurality of ribs on said sleeve engaging a plurality of grooves in said screw, or vice versa, and means imparting movement to said sleeve to simultaneously rotate and longitudinally displace said screw throughout its rearward movement and to move said screw and shutter laterally with respect to the longitudinal axis of the gun.

8. In a gun, a breech, a screw-threaded carriage or shutter associated therewith, a breech-screw having screw threads engaging those on said carriage, a track or way on which said carriage is movable, an externally toothed sleeve mounted on said carriage, connections between said sleeve and screw comprising a rib on one of said parts engaging a groove on the other, and operating means engaging said teeth to simultaneously rotate and longitudinally displace said screw throughout its rearward movement and to laterally displace said screw and shutter on said track or way.

9. In a gun, a breech, a breech-screw provided with a groove extending the length thereof, a non-rotatable carriage or shutter in which said screw rotates, a track or way on which said carriage is movable, a sleeve mounted on said carriage provided externally with teeth and internally with a rib that engages said groove, and operating means engaging said teeth whereby said breech-screw is removed from the breech and laterally displaced on said track or way.

10. In a gun, a breech, a screw-threaded breech-screw, a non-rotatable carriage having screw threads engaging those on said breech-screw in which said screw rotates, a rotatable member mounted on said carriage, connections between said screw and member comprising ribs on one part engaging grooves on the other, a track or way on which said shutter is movable, and means imparting movement to said member to simultaneously rotate and longitudinally displace said screw throughout its rearward movement.

11. In a gun, a screw-threaded breech, a screw engaging therein, a screw-threaded shutter in which said screw rotates, a member movable relative to said screw, and connections between said screw and member whereby movement of the latter will simultaneously rotate and longitudinally displace said screw throughout its rearward movement.

12. In a gun, a continuously screw-threaded breech, a screw engaging therein, a continuously screw-threaded non-rotatable shutter in which said screw rotates, a rotatable member movable relative to said screw, and connections between said screw and member whereby rotation of the latter will simultaneously rotate and displace said screw throughout its rearward movement.

13. In a gun, a breech, a screw, a carriage in which said screw rotates, a rotatable member mounted on said carriage, connections between said member and screw comprising ribs on one part engaging grooves on the other, a track or way on which said carriage is movable, means engaging said screw for automatically connecting said screw and member so that they will move together, and means for rotating said member.

14. In a gun, a breech, a screw engaging therein and provided with a recess, a carriage in which said screw is rotatable, a track or way on which said carriage moves, a rotating member mounted on said carriage and connected to said screw, a pin carried by said member and engaging in said recess at a predetermined period, and means for rotating said member.

15. In a gun, a breech, a screw engaging therein and provided with a recess, a carriage in which said screw is rotatable, a track or way on which said carriage moves, a rotating member mounted on said carriage and connected to said screw, a pin carried by said member and engaging in said recess at a predetermined period, and an endless chain mounted on the gun for rotating said member.

16. In a gun, the combination of a breech provided with screw-threads, a breech-block provided with screw-threads between which latter threads and the threads of the breech a clearance is provided, a carriage or shutter provided with screw-threads which are engaged by the threads of the breech block without play or clearance, and means for forcing the screw-threads on said block into contact with the threads in the breech.

17. In a gun, the combination of a breech provided with screw-threads, a breech block provided with screw-threads between which latter threads and the threads of the breech a clearance is provided, a carriage or shutter provided with screw-threads which are engaged by the threads of the breech-block without play or clearance, and coacting means provided on the front of the breech-block and at the inner end of the screw-threads of the breech for forcing the screw-threads on said block into contact with the threads in the breech.

18. In a gun, the combination of a breech provided with screw-threads the innermost thread being of smaller external diameter than the other threads, a breech-block provided with screw-threads like those in the breech, and a carriage or shutter provided with screw-threads which are engaged by the threads of the breech-block without play or clearance.

19. In a gun, the combination of a breech provided with continuous screw-threads the innermost thread being of smaller external diameter than the other threads, a breech block provided with continuous screw-threads like those in the breech, and a carriage or shutter provided with screw-threads which are engaged by the threads of the breech-block without play or clearance.

In testimony whereof I have signed this specification in the presence of two subscribing witnesses.

EUGÈNE SCHNEIDER.

Witnesses:
H. C. COXE,
R. DE SEVELINGER.

---

Copies of this patent may be obtained for five cents each, by addressing the "Commissioner of Patents. Washington, D. C."